United States Patent
Lu et al.

(10) Patent No.: US 8,406,230 B2
(45) Date of Patent: Mar. 26, 2013

(54) METHOD AND SYSTEM FOR CLASSIFYING PACKETS IN A NETWORK INTERFACE CARD AND INTERFACE FOR PERFORMING THE SAME

(75) Inventors: Yunsong Lu, Sunnyvale, CA (US); Kais Belgaied, Sunnyvale, CA (US)

(73) Assignee: Oracle America, Inc. formerly known as Sun Microsystems, Inc., Redwood Shores, CA (US)

( * ) Notice: Subject to any disclaimer, the term of this patent is extended or adjusted under 35 U.S.C. 154(b) by 829 days.

(21) Appl. No.: 12/164,360

(22) Filed: Jun. 30, 2008

(65) Prior Publication Data

US 2009/0323690 A1    Dec. 31, 2009

(51) Int. Cl.
 *H04L 12/56* (2006.01)
(52) U.S. Cl. .................. 370/392; 370/412; 370/419
(58) Field of Classification Search .................. None
 See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,072,772 A * | 6/2000 | Charny et al. | 370/229 |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 * | 8/2007 | Mehrvar et al. | 370/412 |
| 7,313,142 B2 | 12/2007 | Matsuo et al. | |
| 7,409,460 B1 * | 8/2008 | Li | 709/240 |
| 7,680,139 B1 * | 3/2010 | Jones et al. | 370/414 |
| 2002/0052972 A1 | 5/2002 | Yim | |
| 2003/0037154 A1 | 2/2003 | Poggio et al. | |
| 2004/0024873 A1 * | 2/2004 | DiMambro | 709/225 |
| 2004/0267866 A1 | 12/2004 | Carollo et al. | |
| 2005/0111455 A1 | 5/2005 | Nozue et al. | |
| 2005/0129040 A1 * | 6/2005 | Kiel et al. | 370/412 |
| 2005/0129044 A1 * | 6/2005 | Katayama | 370/412 |
| 2005/0135243 A1 | 6/2005 | Lee et al. | |
| 2005/0138620 A1 | 6/2005 | Lewites | |

(Continued)

OTHER PUBLICATIONS

Droux, N.; "Crossbow Virtualization Architecture"; Aug. 28, 2007; Solaris Core OS, Sun Microsystems, Inc.; 51 pages.

(Continued)

*Primary Examiner* — Gregory Sefcheck
*Assistant Examiner* — Daniel Mitchell
(74) *Attorney, Agent, or Firm* — Osha Liang LLP (57) ABSTRACT

A method for processing packets. The method includes receiving a first packet by a network interface card (NIC) from a network, determining, using a first classification level, a first receive ring group (RRG) for the first packet, determining, using a second level classification, a first receive ring (RR) in the first RRG for the first packet, sending the first packet to the first RR, and sending the first packet from the first RR to a host operatively connected to the network interface card, wherein the first packet is received by a first virtual network interface card (VNIC) associated with the first RRG, where the first RRG is located in the NIC.

20 Claims, 8 Drawing Sheets

U.S. PATENT DOCUMENTS

| | | | |
|---|---|---|---|
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0174324 | A1 | 8/2006 | Zur et al. |
| 2007/0244972 | A1* | 10/2007 | Fan .............................. 709/205 |
| 2008/0002682 | A1* | 1/2008 | Srinivasan et al. ............ 370/389 |
| 2008/0005441 | A1* | 1/2008 | Droux et al. .................. 710/306 |

OTHER PUBLICATIONS

Tripathi, S.; "Data Path: Soft Ring Set (SRS) and Soft Rings for Dynamic Polling & Parallelization"; Jul. 23, 2007; 7 pages.

Tripathi, S.; "Crossbow Architectural Document"; Nov. 21, 2006; 19 pages.

Droux, N.; "Crossbow: Network Virtualization and Bandwidth Partitioning"; presented at CHOSUG, Jun. 19, 2007; 23 pages.

Nordmark; E.; "IP Instances—Network Virtualization Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Tripathi, S.; "Solaris Networking—The Magic Revealed (Part I)"; Sunay Tripathi's Solaris Networking Weblog; Nov. 14, 2005; (22 Pages).

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

\* cited by examiner

METHOD AND SYSTEM FOR CLASSIFYING PACKETS IN A NETWORK INTERFACE CARD AND INTERFACE FOR PERFORMING THE SAME

BACKGROUND

Network traffic is transmitted over a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header includes information regarding the source address, destination address, size, transport protocol used to transmit the packet, and various other identification information associated with the packet. The payload includes the actual data to be transmitted from the network to the receiving system.

Each of the packets sent between the sending system and receiving system is typically associated with a connection. The connection ensures that packets from a given process on the sending system reach the appropriate process on the receiving system. The connection may also be secured by encrypting and authenticating the packets before transmission. Packets received by the receiving system (via a NIC associated with the receiving system) are analyzed by a classifier to determine the connection associated with the packet. If the packets are encrypted, the packets may be decrypted by the CPU, or by a cryptographic offload engine located elsewhere on the receiving system.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing packets. The method includes receiving a first packet by a network interface card (NIC) from a network, determining, using a first classification level, a first receive ring group (RRG) for the first packet, determining, using a second level classification, a first receive ring (RR) in the first RRG for the first packet, sending the first packet to the first RR, and sending the first packet from the first RR to a host operatively connected to the network interface card, wherein the first packet is received by a first virtual network interface card (VNIC) associated with the first RRG, wherein the first RRG is located in the NIC.

In general, in one aspect, the invention relates to a network interface card (NIC). The NIC includes a plurality of receive ring groups (RRGs), wherein each of the plurality of comprises a plurality of receive rings (RRs), classification logic configured to determine, using a first classification level, a first RRG of the plurality of RRGs for a first packet received by the NIC, determine, using a second level classification, a first RR in the first RRG for the first packet, and wherein the first packet is sent to the first RR, wherein the NIC is configured to communicate the first packet to a virtual network interface card (VNIC) executing on a host operatively connected to NIC.

In general, in one aspect, the invention relates to a computer readable medium comprising a plurality of executable instructions for processing packets, wherein the plurality of executable instructions comprises instructions to receive a first packet by a network interface card (NIC) from a network, determine, using a first classification level, a first receive ring group (RRG) for the first packet, determine, using a second level classification, a first receive ring (RR) in the first RRG for the first packet, send the first packet to the first RR, and send the first packet from the first RR to a host operatively connected to the network interface card, wherein the first packet is received by a first virtual network interface card (VNIC) associated with the first RRG, wherein the first RRG is located in the NIC.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for classifying packets in a network interface card (NIC). More specifically, embodiments of the invention relate to a method and system for multilevel packet classification within a NIC using receive ring groups and transmit rings groups. Further, embodiments of the invention provide a method and system for exposing capabilities of the NIC to the host and allowing the host (or processes executing thereon) to configure the NIC using the exposed capabilities.

Figure 1:
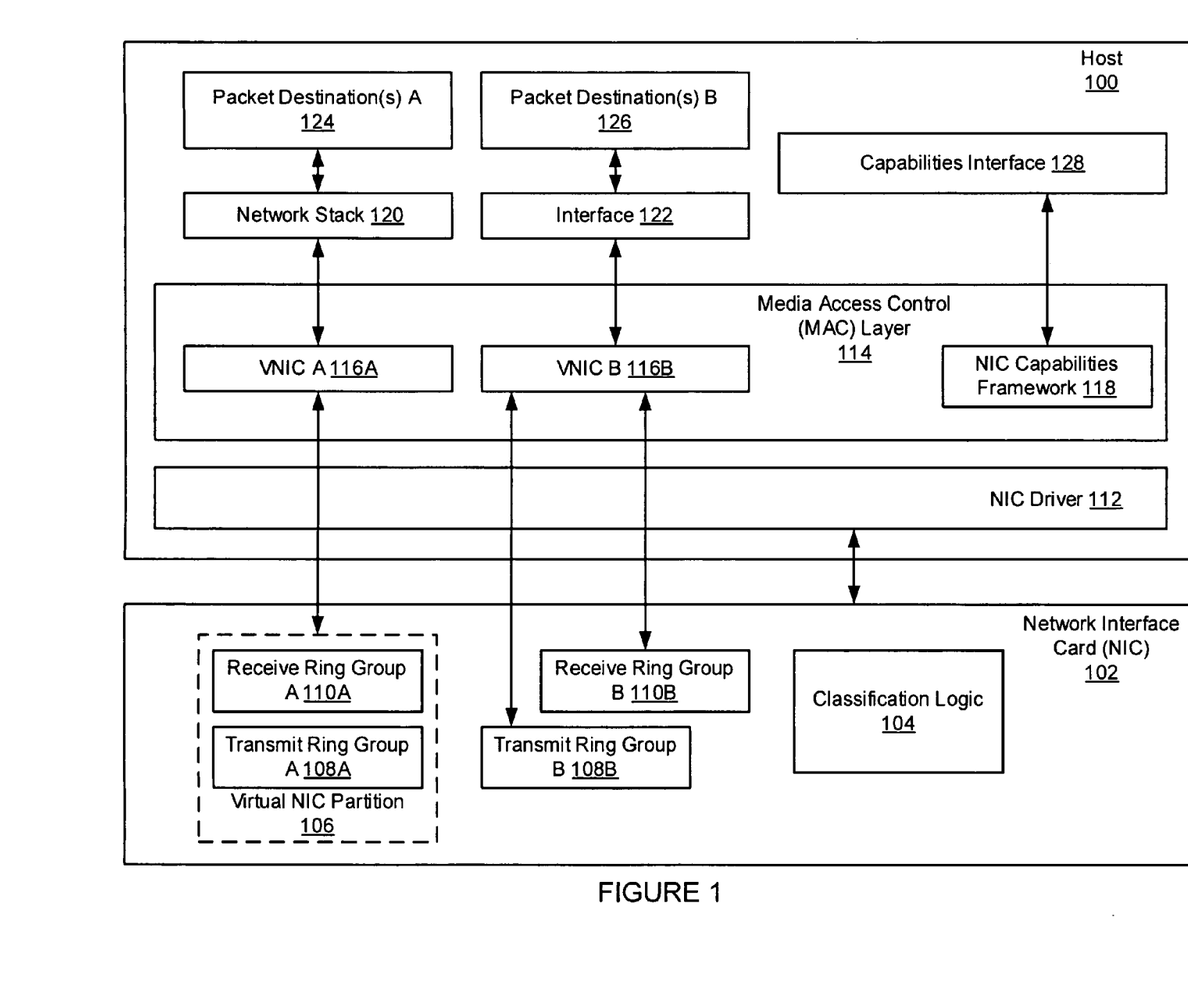
FIGS. 1-4 shows systems in accordance with one or more embodiments of the invention.

FIG. 1 shows a system in accordance with one or more embodiments of the invention. The system includes a network interface card (NIC) (102) operatively connected to a host (100). Each of the components is discussed below in detail.

The NIC (102) includes classification logic (104), receive ring groups (RRGs) (110A, 110B), and transmit ring groups (TRGs) (108A, 108B). Each of the RRGs (110A, 110B) includes a number of receive rings (RRs), where each RR corresponds to a buffer in the NIC. The RRs are configured to temporarily store packets received from the network after the packets have been classified using the classification logic (104) and prior to the packets being transmitted to the host (100). Further, each of the TRGs (108A, 108B) includes a number of transmit rings (TRs), where each RR corresponds to a buffer in the NIC. The TRs are configured to stored packets received from the host (100) after the packets have been processed by the classification logic (104) and prior to the packets being transmitted to the network towards their destination. In one embodiment of the invention, a RRG (110A) and a TRG (108A) may be logically grouped to form virtual NIC partition (106).

The classification logic (104) is configured to classify packets received from the network using, but not limited to, one or more of the following attributes of the packets: (i) media access control (MAC) address; (ii) Internet Protocol (IP) source address, (iii) IP destination address, (iv) protocol number, (v) IPv6 flow identification, and (vi) transport port number associated with a packet destination of the packet.

The classification logic (104) may further include functionality to distribute packets across a number of RRs within a RRG based, for example, on a load balancing policy which specifies an even distribution of packet across the RRs. The classification logic (104) may further include functionality to distribute packets across a number of TRs within a TRG based, for example, on a load balancing policy which specifies an even distribution of packet across the TRs. Additional details about the classification logic (104) are described in FIGS. 2-4 below.

In one embodiment, each RRG (110A, 110B) and each TRG (108A, 108B) may be associated with a set of capabilities. Said another way, capabilities may be associated on a per-RRG basis and/or a per-TRG basis (i.e., applies to all RRs/TRs in the RRG/TRG) as opposed to a per-RR or per-TR basis. In one embodiment of the invention, capabilities may be associated with a virtual NIC partition. Said another way, the virtual NIC partition is considered a single configurable logical entity to which capabilities may be associated.

In one embodiment of the invention, the NIC (102) includes one or more of the following capabilities: (i) multiple interrupt support, (ii) multiple MAC address support; (iii) Large Send Offload (LSO); (iv) header-payload splitting for received packets; (v) Large Receive Offload (LRO); (vi) receive hardware checksum; and (vii) transmit hardware checksum.

In one embodiment of the invention, multiple interrupt support includes functionality to map interrupts from different sources (e.g., from a RR/TR, from a RRG or TRG, from a NIC) to different vectors thereby allowing each of the interrupts to be handled differently and also allow the interrupts to be assigned to different processors. The NIC may support interrupts at one or more of the following levels, which may be selected based on a variety of factors including, but not limited to, hardware implementation, interrupt availability, and processor speed: (i) per-RR, (ii) per-RRG/TRG; and (iii) per-NIC (and/or per-virtual NIC partition).

Per-RR interrupts are allocated and associated with each RR/TR. These interrupts may be toggled on and off independently. Per-ring level interrupts allow packets to be transmitted to the host in parallel from multiple rings. Depending on the implementation, a packet may be delivered by the NIC driver from the per-ring interrupt handler, or may be pulled from RR by host (or process executing thereon, e.g., a virtual network interface (VNIC), network stack, etc). Further, on the transmit side, a transmit completion routine may be invoked for a TR for faster recycling of the TR descriptors (i.e., pointers used by the host to identify the TR and transmit packets to the TR). Per-RRG/TRG interrupts enable events relevant to RRs/TRs in the RRGs/TRGs to be reported through a common interrupt(s). Finally, per-NIC interrupts (and/or per-virtual NIC partition) enable events from/for RRGs/TRGs to be reported via a common interrupt(s).

In one embodiment of the invention, multiple MAC address support enables multiple unique MAC addresses to be assigned to a single RRG. In such cases, the same MAC address cannot be associated with two different RRGs within the NIC. In one embodiment of the invention, LSO enables large segments (e.g., $\geqq 64$ KB) to be transmitted to the NIC in a single data transfer. The NIC may subsequently segment the large segment into multiple MTU-sized packets (which include the appropriate headers and checksums) and then send the packets to the network. In one embodiment of the invention, LRO corresponds to functionality to aggregate multiple packets received from the network into a single large segment and then transmit this segment to the host. In one embodiment of the invention, header-payload splitting corresponds to functionality to separate packet headers and payloads into separate RRs in the NIC.

Continuing with the discussion of FIG. 1, the host (100) includes a NIC driver (112), which provides an interface between the NIC (102) and the host (100). Further, the host (100) includes a MAC layer (114) and one or more packet destinations (124, 126).

In one embodiment of the invention, the MAC layer (114) includes one or more VNICs (116A, 116B). Each VNIC (116A, 116B) in the host (100) includes the same functionality as the NIC (102). However, unlike the NIC (102), the VNICs (116A, 116B) are implemented in the host (100), typically, in a MAC layer of the host (100). To all components above the VNICs (116A, 116B) (e.g., the network stack (120), the packet destinations (124, 126), etc.) the VNICs (116A, 116B) appear as physical NICs. Each VNIC (116A, 116B) is associated with one or more MAC addresses and/or an IP addresses. Further, each VNIC (116A, 116B) may be optionally associated with a Transport Control Protocol (TCP) port or User Datagram Protocol (UDP) port.

Further, each VNIC (116A, 116B) is associated with a RRGs (110A, 110B) or a virtual NIC partition (106) such that the VNICs (116A, 116B) obtain packets from the RRGs (110A, 110B) or the virtual NIC partition (106) with which it is associated. For example, VNIC B (110B) obtains packets from RRG B (110B). In addition, each VNIC (116A, 116B) is configured to send packets received from the RRGs (110A, 110B) to a Network Stack (120) (which includes a network layer and a transport layer) or to an interface (122).

In one embodiment of the invention, the network layer is configured to perform network layer processing. Network layer processing corresponds to functionality to manage packet addressing and delivery on a network (e.g., functionality to support Internet Protocol (including, but not limited to, IPv4 and IPv6), Address Resolution Protocol (ARP), Internet Control Message Protocol (ICMP), etc.). In one embodiment of the invention, the transport layer is configured to perform transport layer processing. Transport layer processing corresponds to functionality to manage the transfer of packets on the network (e.g., functionality to support TCP, UDP, Stream Control Transmission Protocol (SCTP), etc.).

Further, each VNIC (116A, 116B) is associated with a TRGs (108A, 108B) or a virtual NIC partition (106) such that the VNICs (116A, 116B) transmit packets to the TRGs (108A, 108B) or the virtual NIC partition (106) with which it is associated. For example, VNIC B (108B) transmits packets to TRG B (108B).

Continuing with the discussion of FIG. 1, as discussed above, VNICs (116A, 116B) transmit packets to and receive packets from a network stack (120) or an interface (122). In one embodiment of the invention, the VNICs (116A, 116B) transmit packets to the network stack (120) when the packet destination (124) is in the host (100). Said another way, if the packet destination (124) is an application executing on host (100), then the packet destination (124) may receive packets from the network stack (120). Alternatively, if the packet destination (126) is a guest domain executing on the host (e.g., a guest operating system executing in a Xen® domain), then VNIC (116B) transmits the packet to an interface which may then transmit the packet to the guest domain. The guest domain may then process the packet using its own network stack and ultimately transmit the packet to the appropriate process executing within the guest domain. Xen® is a trademark overseen by the Xen Project Advisory Board. Those skilled in the art will appreciate that other virtualization technologies such as VMware® Server (VMware® a registered trademark of VMware, Inc.) and Solaris™ Containers (Solaris™ is a trademark of Sun Microsystems, Inc.) may be used.

Further, those skilled in the art will appreciate that while FIG. 1 shows a host (100) that includes packet destinations (124, 126) in the host (100) and within guest domain, the invention may be implemented on a host that does not support virtualization.

Continuing with the discussion of FIG. 1, the MAC layer (114) includes a NIC Capabilities Framework (118) which is configured to obtain and store properties and capabilities of the NIC (102), and manage the configuration of the NIC (102). In one embodiment of the invention, the NIC Capabilities Framework (118) is also configured to expose the capabilities of the NIC to the host (and processes executing thereon) via a capabilities interface (128). Users of the host may use the capabilities interface (128) to ascertain the properties of the NIC (102) and to configure the NIC by providing the NIC Capabilities Framework (118) with configuration information for the NIC.

In embodiment of the invention, the NIC Capabilities Framework (118) is configured to query the NIC (via the NIC driver) to populate and maintain the following data structures:

Data Structure Defined to Determine Information about RRGs/TRGs

```
typedef enum {
    MAC_RING_TYPE_RX = 1, /* Receive ring */
    MAC_RING_TYPE_TX = 2 /* Transmit ring */
} mac_ring_type_t;
typedef enum {
    mac_rx_ring_info_t,
    mac_tx_ring_info_t
} mac_ring_info_t;
typedef void (*mr_get_ring_t)(void *,
mac_ring_type_t, mac_ring_grp_drv_t,
const int, mac_rx_info_t *, mac_ring_handle_t);
```

-continued

```
typedef void (*mr_get_ring_group_t)(void *,
mac_ring_type_t, const int, void
*, mac_ring_group_handle_t);
typedef void (*mr_add_ring_t)(void *, void *, mac_ring_type_t);
typedef void (*mr_rem_ring_t)(void *, void *, mac_ring_type_t);
typedef struct mac_capab_rings_s {
    uint_t mr_rnum; /* Number of rings */
    mr_get_ring_t mr_get_ring; /* Get ring from driver */
    uint_t mr_gnum; /* Number of ring groups */
    mr_get_group_t mr_get_group; /* Get ring groups from driver */
    mr_add_ring_t mr_add_ring; /* Add ring into a group */
    mr_rem_ring_t mr_rem_ring; /* Remove ring from a group */
} mac_capab_rings_t;
```

The following describes the aforementioned functions and data structure: (i) mr_rnum: stores the number of RR/TRs exposed; (ii) mr_get_ring: is a function used to obtain RR/TR information from the NIC driver. The first argument in the function is void * (a pointer of NIC driver handle registered in mac_register( )). The second argument in the function is mac_ring_type which indicates the type of ring (receive or transmit). The third argument in the function is the index identifying the RR/TR (a number between 0 and (mr_rnum–1)). Depending on the mac_ring_type, the NIC driver will interpret the forth argument in the function, "mac_ring_info_t", as either mac_rx_ring_info_t or mac_tx_ring_info_t; (iii) the mac_ring_handle_t is the NIC Capabilities Framework handle for the RR/TR, which the NIC driver uses for all subsequent calls (e.g., notifications of RR/TR status change) to the NIC Capabilities Framework referring to the RR/TR; (iv) mr_gnum: the number of TRGs/RRG exposed; (v) mr_get_group: the function used to obtain RRG/TRG information from the NIC driver—this function is similar to (*mr_get_ring)( ) except that obtains RRG/TRG information; (vi) mr_add_ring: this function, if supported, allows any RR/TR exposed separately to be added into any exposed RRG/TRG. The first argument is a RRG/TRG handle from the NIC driver, and the second argument is the RR/TR handle; and (vii) mr_rem_ring: is a function used to remove a previously added RR/TR from a RRG/TRG.

The following data structure is defined to register RRs:

Data Structure Defined to Register RRs

```
typedef int (*mac_ring_start_t)(mac_ring_drv_t);
typedef void (*mac_ring_stop_t)(mac_ring_drv_t);
typedef mblk_t *(*mac_rx_ring_poll_t)(mac_ring_drv_t, int);
typedef struct mac_rx_ring_info_s {
    mac_ring_drv_t mr_driver;
    mac_intr_t mr_intr;
    mac_ring_start_t mr_start;
    mac_ring_stop_t mr_stop;
    mac_rx_ring_poll_t mr_poll;
} mac_rx_ring_info_t;
```

The following describes the aforementioned functions and data structure: (i) mr_driver: RR handle registered by NIC driver; (ii) mr_intr: per-RR interrupt handle, which enables the NIC Capabilities Framework to disable interrupt and switch RR to polling mode (i.e., packets pulled from RR to host); (iii) mr_start: this per-ring function starts the RR. Specifically, this function initiates hardware initialization of the RR, allocates Direct Memory Access (DMA) buffers for incoming packets, etc. If this function returns an error, the NIC Capabilities Framework may need to select another RR to start or retry the RR at a later time; (iv) mr_stop: this per-ring function stops the RR; (v) mr_poll: this polling function obtains a number of packets from the RR via the NIC driver. Specifically, this function's first argument is a RR handle implemented by NIC driver, and the second argument is the number of bytes to be transferred during the polling.

The following data structure is defined to register RRGs:

Data Structure Defined to Register RRGs

```
typedef int (*mac_ring_grp_start_t)(mac_ring_grp_drv_t);
typedef void (*mac_ring_grp_stop_t)(mac_ring_grp_drv_t);
typedef int (*mac_set_mac_addr_t)(mac_ring_grp_drv_t, uint8_t *);
typedef int
    (*mac_add_mac_addr_t)(mac_ring_grp_drv_t, uint8_t *);
typedef int
    (*mac_rem_mac_addr_t)(mac_ring_grp_drv_t, uint8_t *);
typedef int
    (*mac_set_lb_policy_t)(mac_ring_grp_drv_t, mac_lb_policy_t);
typedef int
        (*mac_add_rule_t)(mac_ring_grp_drv_t, mac_ring_drv_t *,
        mac_rts_rule_t);
typedef int
        (*mac_rem_rule_t)(mac_ring_grp_drv_t, mac_ring_drv_t *,
        mac_rts_rule_t);
typedef struct mac_rx_ring_group_info_s {
    mac_ring_grp_drv_t mrg_driver;
    mac_intr_t mrg_intr; /* Optional per-group interrupt */
    mac_ring_grp_start_t mrg_start; /* Start the group */
    mac_ring_grp_stop_t mrg_stop; /* Stop the group */
    uint_t mrg_rnum; /* Number of ring in the group */
    mac_set_mac_addr_t mrg_setmac; /* Set the default MAC addr */
    mac_add_mac_addr_t mrg_addmac;
    /*Add a MAC address to the group*/
    mac_rem_mac_addr_t mrg_remmac;
    /*Remove a pre-added MAC address*/
    mac_set_lb_t mrg_setlb; /* RX load balancing Policy */
    mac_add_rule_t mrg_addrule;/* Add a classification rule */
    mac_rem_rule_t mrg_remrule;/* Remove a classif'ion rule */
} mac_rx_ring_group_info_t;
```

The following describes the aforementioned functions and data structure: (i) mrg_driver: RRG handle registered by NIC driver; (ii) mrg_intr: per-RRG interrupt if per-RR interrupts are not guaranteed by hardware or system; (iii) mrg_start: optional function that starts the RRG; (iv) mrg_stop: optional function that stops the RRG; (v) mrg_rnum: number of pre-assigned RR, if zero, the RRG is capable to be regrouped later; (vi) mrg_setmac: function that sets a MAC address to a RRG; (vii) mrg_addmac: optional function that adds an additional MAC addresses to the RRG; (viii) mrg_remmac: paired with mrg_addmac, this function removes a pre-added MAC address from the RRG; (ix) mrg_setlb: this function changes policy associated with receive loading balancer associated with the RRG; (x) mrg_addrule: this function adds a rule for receive traffic steering (RTS) for the RRG; (xi) mrg_remrule: paired with mrg_addrule, the function is used to remove a pre-added classification rule.

The following data structure is defined to register TRs:

Data Structure Defined to Register TRs

```
typedef int (*mac_ring_start_t)(mac_ring_drv_t);
typedef void (*mac_ring_stop_t)(mac_ring_drv_t);
typedef mblk_t *(*mac_tx_ring_send_t)(mac_ring_drv_t, mblk_t *);
typedef struct mac_tx_ring_info_s {
    mac_ring_drv_t mr_driver;
    mac_intr_t mr_intr;
    mac_ring_start_t mr_start;
    mac_ring_stop_t mr_stop;
    mac_tx_ring_send_t mr_send;
} mac_tx_ring_info_t;
```

The following describes the aforementioned functions and data structure: (i) mr_driver: TR handle registered by NIC driver; (ii) mr_intr: per-TR interrupt handle; (iii) mr_start: optional per-TR function for starting the TR; (iv) mr_stop: optional per-TR function that stop the TR; (v) mr_send: function transmit the packet to the TR.

In one embodiment of the invention, the NIC Capabilities Framework is notified of changes in TRs using the following event notification scheme:

Event Notification

```
typedef enum {
    MAC_EVENT_DEV_LINK_UP = 1,
    MAC_EVENT_DEV_LINK_DOWN = 2,
    MAC_EVENT_RING_TX_AVAILABLE = 3
} mac_event_type_t;
typedef void *mac_event_obj_t;
typedef void *mac_event_info_t;
void mac_event_update(mac_event_type_t,
    mac_event_obj_t, mac_event_info_t);
```

The NIC driver is configured to call mac_event_update( ) to notify the host of the availability of TR descriptors. The notification may be made in the interrupt context. Further, the mac_event_type may be extended to handle additional types of driver/hardware events.

Figure 2:
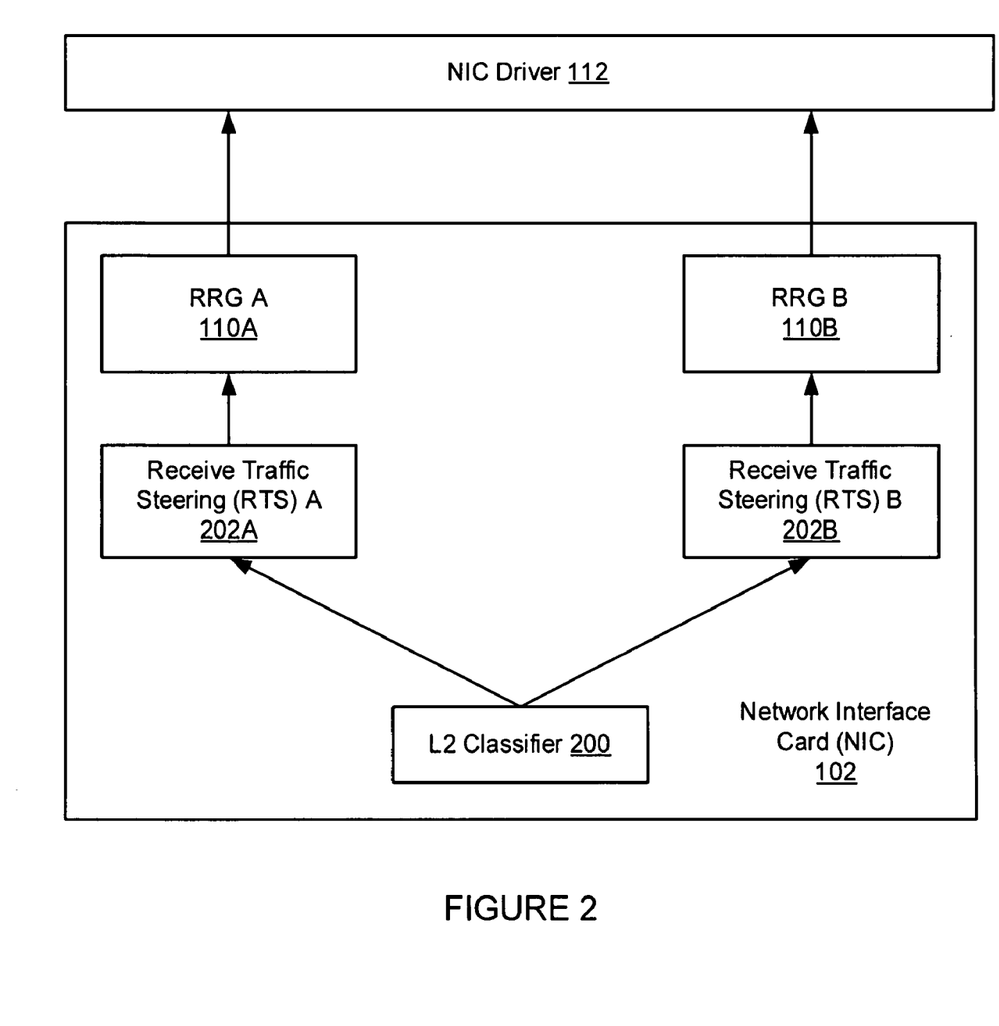

As discussed above, FIGS. 2-4 provide additional detail with respect to classification of received packets and transmitted packets. Referring to FIG. 2, FIG. 2 shows a NIC in accordance with one or more embodiments of the invention. As shown in FIG. 2, packets received by the NIC are initially classified using an L2 classifier (200). The L2 classifier is implemented by the classification logic (104) and classifies received packets using media access control addresses (MACs).

Specifically, the L2 classifier (200) determines the MAC address associated with the received packet and then determines which of the RRGs (110A, 110B) are associated with the MAC. As discussed above, each RRG (110A, 110B) may be associated with multiple MAC addresses. Further, the L2 classifier (200) also includes a default rule which specifies a RRG (110A, 110B) to send received packets to which include MAC address which is not associated with any of the RRG (110A, 110B).

Once L2 classifier determines to which RRG (110A, 110B) the packet is to be transmitted, the received packet is further classified using higher-level classification. The higher-level classification is performed for each RRG (110A, 110B) using the associates Receive Traffic Steering (RTS) (202A, 202B). The RTS (202A, 202B) is implemented by the classification logic (104).

Figure 3:
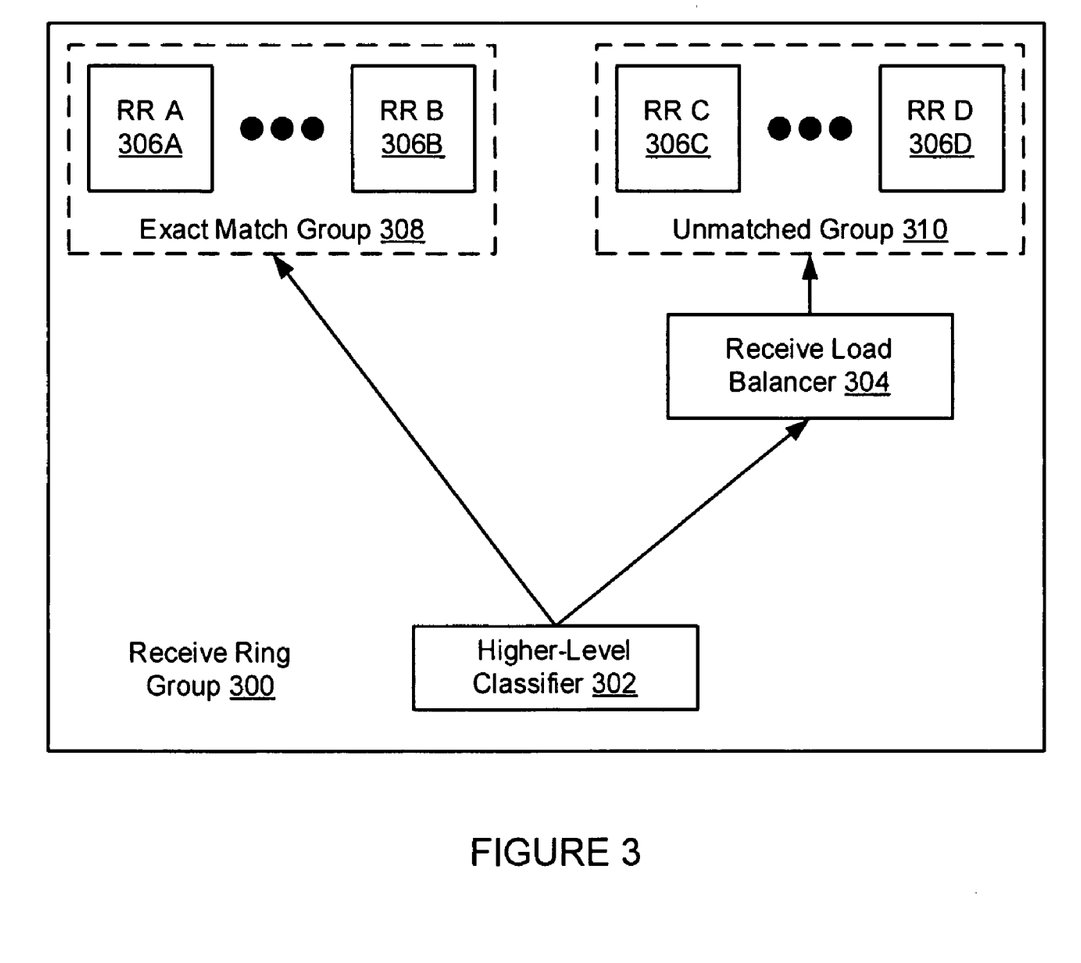

Referring to FIG. 3, the RTS (202A, 202B) may further classify the received packet using: IP source address, IP destination address, protocol number, IPv6 flow identification, on a transport port number, any combination thereof, or no higher-level classification rules. If the received packet matches a rule in the higher-level classification, the packet is transmitted to an appropriate RR (306A, 306B) (i.e., the RR associated with the rule) in the exact match group (308). Alternatively, if the received packet does not match any rule in the higher-level classification, the packet is transmitted to the unmatched group (310) of RRs (306C, 306D). If the RRG (300) includes an unmatched group (310) with multiple RRs (306C, 306D), then the packets may be load balanced (using the receive load balancer (304)) across the RRs (306C, 306D) in the unmatched group (310) such that each RR (306C, 306D) receives approximately the same number of packets. If the higher-level classification does not include any rules, the packets may be distributed across the RRs (306A, 306B, 306C, 306D) using the receive load balancer (304).

Figure 4:
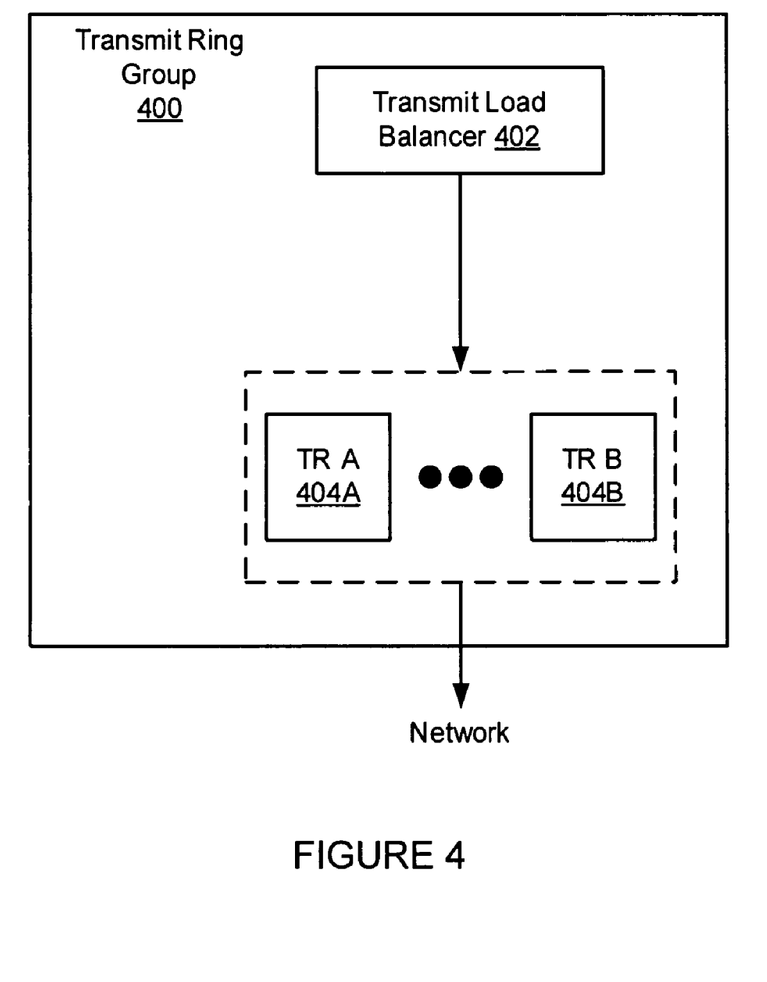

Referring to FIG. 4, FIG. 4 shows a TRG in accordance with one or more embodiments of the invention. Specifically, packets received from the host (100) by the TRG (400) may be load balanced (using the transmit load balancer (402)) across the TRs (404A, 404B) in the TRG (400) such that each TR (404A, 404B) receives approximately the same number of packets.

Figure 5:
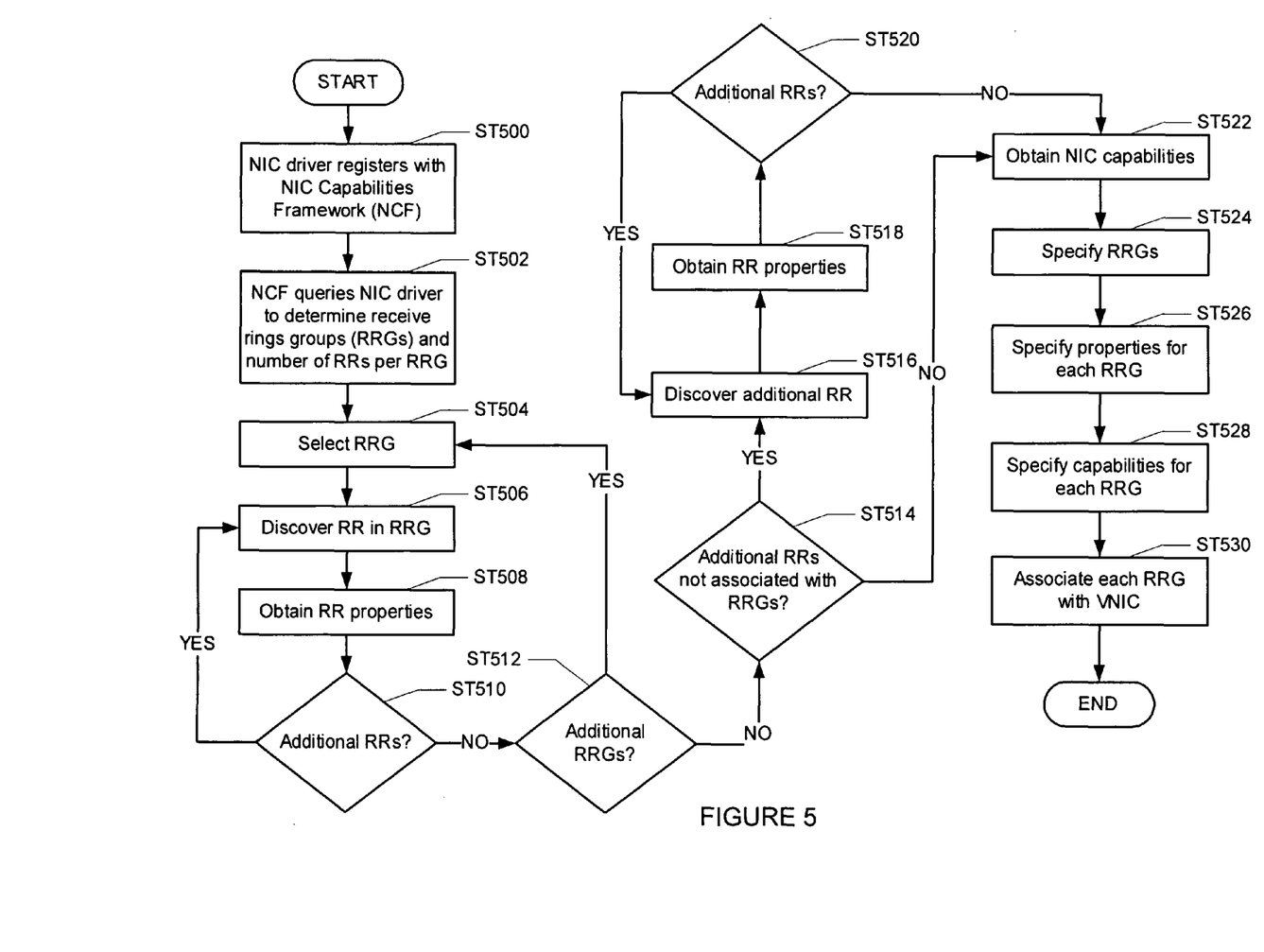
FIGS. 5-7 show flowcharts in accordance with one or more embodiments of the invention.
Figure 6:
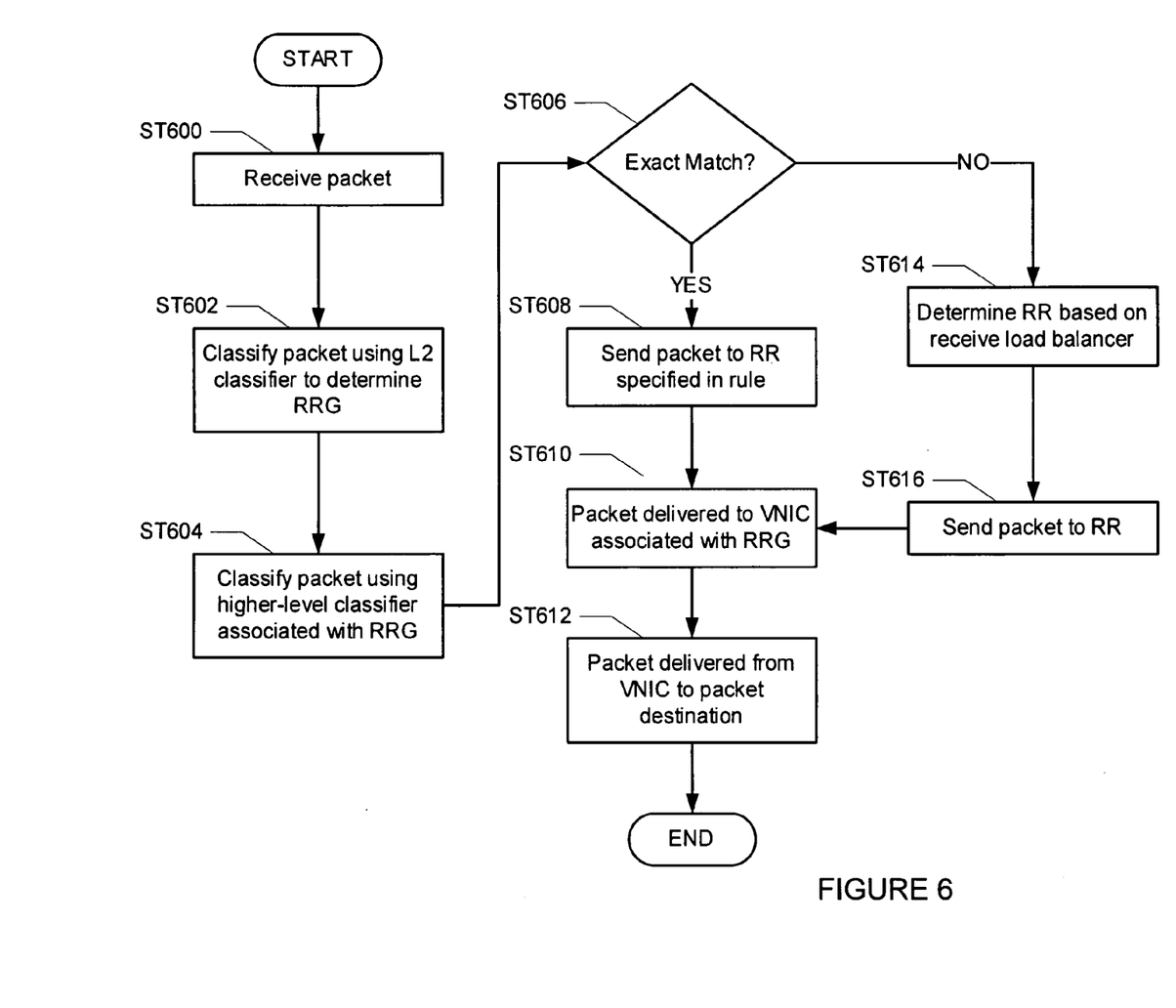
Figure 7:
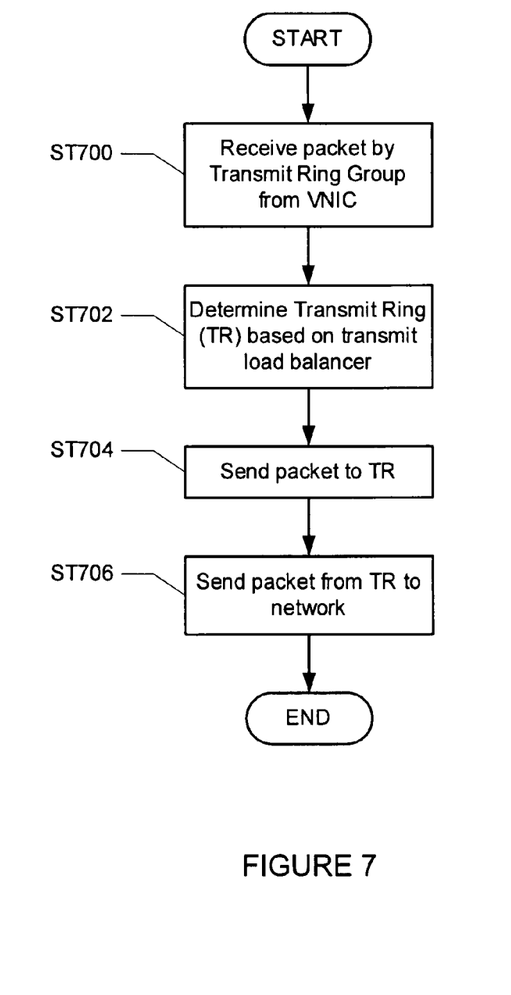

FIGS. 5-7 show a flowchart of a method for creating a virtual network path in accordance with one or more embodiments of the invention. In one or more embodiments of the invention, one or more of the steps shown in FIGS. 5-7 may be omitted, repeated, and/or performed in a different order. Accordingly, embodiments of the invention should not be considered limited to the specific arrangement of steps shown in FIG. 5-7.

FIG. 5 shows a flowchart in accordance with one or more embodiments of the invention. More specifically, FIG. 5 shows a method for obtaining NIC properties and NIC capabilities, and then configuring the NIC based on the discovered properties and capabilities.

In ST500, the NIC driver registers with the NIC Capabilities Framework (NCF). In ST502, the NCF queries the NIC driver to determine the number of RRGs and the number of RRs per RRG. ST502 may include issuing one or more of the functions and populating one or more of the data structures described above with respect to determining information about the RRGs. In ST504, a RRG (discovered in ST502) is selected.

In ST506, a RR within the RRG is discovered and in ST508, information about the RR is obtained. ST506 and ST508 may include issuing one or more of the functions and populating one or more of the data structures described above with respect to registering RRs.

In ST510, a determination is made about whether there are any additional RRs in the RRG to discover. If there are additional RRs in the RRG to discover, the method proceeds to ST506. If there are no additional RRs in the RRG to discover, the method proceeds to ST512. In ST512, a determination is made about whether there are additional RRGs to analyze. If there are additional RRGs to analyze, the method proceeds to ST504. If there are no additional RRGs to analyze, the method proceeds to ST514.

In ST514, a determination is made about whether there are additional RRs not associated with the RRGs discovered in ST502. If there are additional RRs not associated with the RRGs discovered in ST502, the method proceeds to ST516. If not, the method proceeds to ST522. In ST516, a RR is discovered and in ST518, information about the RR is obtained. ST516 and ST518 may include issuing one or more of the functions and populating one or more of the data structures described above with respect to registering RRs. In ST520, a determination is made about whether there are any additional RRs to discover. If there are additional RRs to discover, the method proceeds to ST516. If there are no additional RRs to discover, the method proceeds to ST522.

In ST522, the NIC capabilities are obtained. In ST524, RRGs are specified. Those skilled in the art will appreciate that ST524 may be omitted if RRGs have already been specified by default by the NIC. Further, ST524 may include removing default RRGs and/or creating new RRGs. In ST526 the properties for each RRG are specified. ST526 may include issuing one or more of the functions and populating one or more of the data structures described above with respect to registering the RRGs. For example, ST526 may include specifying multiple MAC address for one or more RRGs, specifying rules for use in higher-level classification, etc.

In ST528, NIC capabilities (or subsets thereof) are associated with one or more of the RRGs. For example, a RRG may be associated with LRO such that all packets received by RRG are processed using LRO (regardless of the individual RR within the RRG in which the packet is placed). ST528 may include associating certain capabilities with certain RRGs. Alternatively, ST528 may be omitted if the NIC does not include any capabilities (as defined above). In ST530, each RRG is associated with a VNIC in the host. At this stage, the NIC is ready to receive packets.

A similar method may be performed with respect to registering TRGs and TRs. Further, the RRGs and TRGs may be grouped to define virtual NIC partitions. Further, the method shown in FIG. 5 (or portions thereof) may be performed when the NIC driver initially registers with the NCF as well as other times during the operation of the NIC. For example, a portion of FIG. 5 may be performed when the RR are redistributed across the RRGS and/or rules for higher-level classification are modified. Further, the method in FIG. 5 may be extended to grouping RRGs and TRGs to obtain virtual NIC partitions and then configuring the virtual NIC partitions.

FIG. 6 shows a flowchart in accordance with one or more embodiments of the invention. More specifically, FIG. 6 shows a method for processing a packet received from the network in accordance with one or more embodiments of the invention.

In ST600, a packet is received from the network by the NIC. In ST602, the packet is classified using an L2 classifier to determine a RRG. In ST604, the classify packet using higher-level classification associated with the RRG. In ST606, a determination is made about whether the packet matched one of the higher-level classification rules. If the packet matched one of the higher-level classification rules, then the method proceeds to ST608. If not, the method proceeds to ST614.

In ST608, the packet is sent to the RR specified in/associated with the rule the packet matched in ST606. In ST610, the packet is delivered to the VNIC associated with RRG using interrupt or polling mechanisms. In ST612, the packet is delivered from the VNIC to the packet destination. In ST614, a RR in the RRG is selected using a receiver load balancer. In ST616, the packet is transmitted to the RR selected in ST614. The method then proceeds to ST610.

Those skilled in the art will appreciate that a NIC may process multiple packets in parallel. Accordingly, one or more of the steps in FIG. 6 may be performed in parallel for different packets.

FIG. 7 shows a flowchart in accordance with one or more embodiments of the invention. More specifically, FIG. 7 shows a method for processing a packet received from the host in accordance with one or more embodiments of the invention. In ST700, the packet is received by the TRG from a VNIC. In ST702, a transmit load balancer is used to select the TR to which the transmit the packet. In ST704, the packet is transmitted to the TR selected in ST702. In ST706, the packet is issued from the TR to the network.

The following are examples of one or more embodiments of the invention are not intended to limit the scope of the invention.

EXAMPLE 1

Consider the scenario in which the NIC includes eight TRs and eight RRs. Further, the NIC supports: (i) a maximum of four RRGs, (ii) packet classification within a RRG, which may include receive load balancing; (iii) sixteen MAC addresses; and (iv) multiple interrupt support on a per-RRG basis.

Using one or more embodiments of the invention, the NIC Capabilities Framework may discovery the above properties of the NIC. Further, using one or more embodiments of the invention, the eight TRs may be grouped in to four TRGs, each associated with four MAC addresses. A software transmit load balancer may be associated with each of the four TRGs to distribute packets across the TRGs.

One or more embodiments of the invention may further allow the NIC Capabilities Framework to register all four RRGs without associating any of the RRs with the RRGs. A user may subsequently group the RRs using the mr_add_ring( )/mr_rem_ring( ) via the NIC Capabilities Framework and the Capabilities Interface. Further, the user may also associate the sixteen MAC addresses with the RRGs in a manner they select.

EXAMPLE 2

Consider the scenario in which the NIC includes: (i) eight TRs (without grouping); (ii) eight RRs (without grouping); (iii) Prioritized (RTS); (iv) socket pair direct match hashing; (v) TCP/UDP port steering; (vi) MAC addresses classification; (vii) up to 32 MAC addresses supported per RR; and (viii) Per-RR multiple interrupt support.

Using one or more embodiments of the invention, the aforementioned NIC properties may be discovered. Further, all RRs may be grouped into a single RRG and use either (a) socket pair direct match hashing or (b) TCP/UDP port steering to load balance the received packets across the RRs. Alternatively, the NIC Capabilities Framework may register eight single-ring groups with multiple MAC addresses support, up to 32 addresses per RR. The first configuration maximizes the receive side performance, while the second configuration maximize the NIC's virtualization capabilities. Those skilled in the art will appreciate that other configurations may be implemented using the aforementioned NIC.

Figure 8:
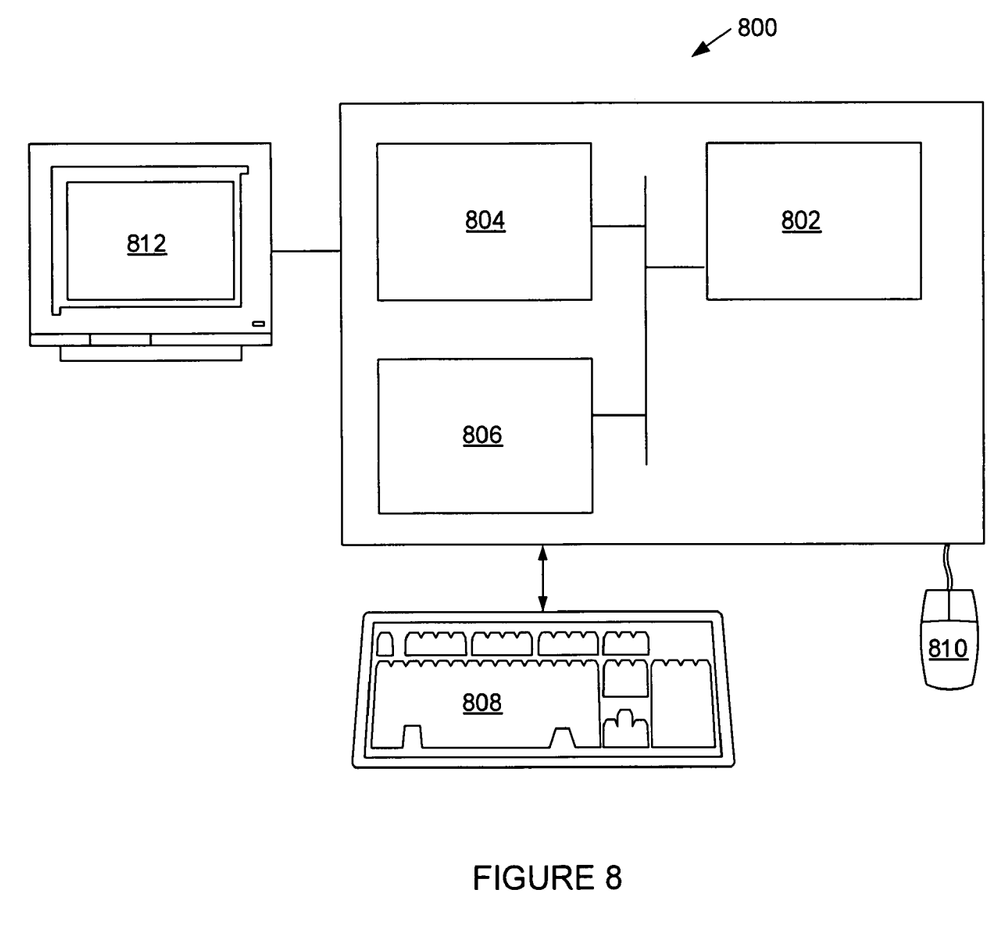
FIG. 8 shows a computer system in accordance with one or more embodiments of the invention.

The invention may be implemented on virtually any type of computer regardless of the platform being used. For example, as shown in FIG. 8, a computer system (800) includes a processor (802), associated memory (e.g., Random Access Memory, Read-only memory, etc.) (804), a storage device (806), and numerous other elements and functionalities typical of today's computers (not shown). The computer (800) may also include input means, such as a keyboard (808) and a mouse (810), and output means, such as a monitor (812). The computer system (800) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (800) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis interconnect. Examples of such computers include, but are not limited to, multi-processor servers, network appliances, and light-weight computing devices (e.g., computers that only include memory, a processor, a mechanism to physically connect to and communicate over the chassis interconnect), and the necessary hardware to enable the aforementioned components to interact.

Further, those skilled in the art will appreciate that if one or more computers, which are not blades, are not used to implement the invention, then an appropriate chassis may be used in place of the blade chassis.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets, comprising:
receiving, by a network interface card (NIC) comprising a plurality of receive ring groups (RRGs), a first packet from a network;
identifying a first L2 classification item in a header of the first packet;
selecting, based on the first L2 classification item, a first receive ring group (RRG) of the plurality of RRGs, wherein the first RRG comprises a plurality of receive rings (RRs);
identifying a first higher-level classification item in the header of the first packet;
identifying, in response to selecting the first RRG, a first receive load balancer of the first RRG located in the NIC;
selecting, based on the first higher-level classification item and a load balancing policy of the first receive load balancer, a first RR of the plurality of RRs;
sending, in response to selecting the first RR, the first packet to the first RR; and
sending the first packet from the first RR to a host operatively connected to the NIC, wherein the first packet is received by a first virtual network interface card (VNIC) associated with the first RRG.

2. The method of claim 1, further comprising:
receiving, by the NIC, a second packet from the network;
identifying a second L2 classification item in a header of the second packet;
selecting, based on the second L2 classification item, a second RRG of the plurality of RRGs for the second packet;

identifying a second higher-level classification item in the
header of the second packet;
identifying, in response to selecting the second RRG, a
second receive load balancer of the second RRG in the
NIC;
selecting, based on the second higher-level classification
item and a load balancing policy of the second receive
load balancer, a second RR in the second RRG for the
second packet;
sending, in response to selecting the second RR, the second
packet to the second RR; and
sending the second packet from the second RR to the host,
wherein the second packet is received by a second
VNIC.

3. The method of claim 1, wherein the first L2 classification item is a media access control address.

4. The method of claim 1, wherein sending the first packet from the first RR to the host comprises one selected from a group consisting of using an interrupt issued by the NIC and receiving a polling request from the host.

5. The method of claim 1, further comprising:
receiving, by the NIC, a second packet from the first VNIC on the host, wherein the first VNIC is associated with a transmit ring group comprising a plurality of transmit rings;
selecting, using a transmit load balancer, a transmit ring of the plurality of transmit rings;
sending the second packet to the transmit ring; and
issuing, by the NIC, the second packet from the transmit ring to the network.

6. The method of claim 1, further comprising:
evaluating a plurality of higher-level classification rules associated with the first RRG; and
determining, based on evaluating the plurality of higher-level classification rules and before selecting the first RR, that the second higher-level classification item does not match any of the plurality of RRs.

7. The method of claim 1, wherein the higher-level classification item is at least one selected from a group consisting of an internet protocol (IP) source address, an IP destination address, a protocol number, an IPv6 flow identification, and a transport port number associated with a packet destination of the first packet.

8. The method of claim 1, wherein the L2 classification item is a media access control address.

9. A network interface card (NIC), comprising:
a plurality of receive ring groups (RRGs); and
a plurality of classification logic configured to:
identify a first L2 classification item in a header of a first packet received by the NIC;
select, based on the first L2 classification item, a first RRG of the plurality of RRGs, wherein the first RRG comprises a plurality of receive rings (RRs);
identify a first higher-level classification item in the header of the first packet;
identify, in response to selecting the first RRG, a first receive load balancer of the first RRG;
select based on the first higher-level classification item and a load balancing policy of the first receive load balancer, a first RR of the plurality of RRs,
wherein the first packet is sent to the first RR in response to selecting the first RR, and
wherein the NIC is configured to send the first packet to a virtual network interface card (VNIC) executing on a host operatively connected to the NIC.

10. The NIC of claim 9, wherein the first RRG is associated with a plurality of media access control (MAC) addresses, and wherein selecting the first RRG comprises identifying a MAC address of the first packet in the plurality of MAC addresses.

11. The NIC of claim 9, further comprising:
a transmit ring group (TRG) comprising a plurality of transmit rings (TRs), wherein the plurality of classification logic is configured to select, using a transmit load balancer, a transmit ring of the plurality of TRs to which to send a second packet,
wherein the TRG is associated with the VNIC on the host and wherein the second packet is issued by second VNIC,
wherein the second packet is sent to the transmit ring, and
wherein the NIC issues the second packet from the transmit ring to a network.

12. The NIC of claim 11, wherein the first RRG and the TRG are logically grouped together to form a virtual network device partition associated with the VNIC.

13. The NIC of claim 9, wherein the plurality of classification logic is further configured to:
evaluate a plurality of higher-level classification rules associated with the first RRG; and
determine, based on evaluating the plurality of higher-level classification rules and before selecting the first RR, that the second higher-level classification item does not match to any of the plurality of RRs.

14. A non-transitory computer readable medium comprising a plurality of executable instructions for processing packets, wherein the plurality of executable instructions comprise functionality to:
receive, by a network interface card (NIC) comprising a plurality of receive ring groups (RRGs), a first packet from a network;
identify a first L2 classification item in a header of the first packet;
select, based on the first L2 classification item, a first receive ring group (RRG) of the plurality of RRGs, wherein the first RRG comprises a plurality of receive rings (RRs);
identify a first higher-level classification item in the header of the first packet;
identify, in response to selecting the first RRG, a first receive load balancer of the first RRG located in the NIC;
select, based on the first higher-level classification item and a load balancing policy of the first receive load balancer, a first RR of the plurality of RRs;
send, in response to selecting the first RR, the first packet to the first RR; and
send the first packet from the first RR to a host operatively connected to the NIC, wherein the first packet is received by a first virtual network interface card (VNIC) associated with the first RRG.

15. The non-transitory computer readable medium of claim 14, wherein the plurality of executable instructions further comprise functionality to:
receive, by the NIC, a second packet from the network;
identify a second L2 classification item in a header of the second packet;
select, based on the second L2 classification item, the first RRG for the second packet;
select, based on the second L2 classification item and the load balancing policy, a second RR of the plurality of RRs;
send, in response to selecting the second RR, the second packet to the second RR; and send the second packet from the second RR to the host, wherein the second packet is received by the first VNIC.

16. The non-transitory computer readable medium of claim 14, wherein the plurality of executable instructions further comprise functionality to:
   receive, by the NIC, a second packet from the network;
   identify a second L2 classification item in a header of the second packet;
   select, based on the second L2 classification item, a second RRG of the plurality of RRGs,
      wherein the second RRG is associated with a higher-level classifier, and
      wherein the higher-level classifier is only used by the second RRG;
   identifying a second higher-level classification item in the header of the second packet;
   identify, in response to selecting the second RRG, a second receive load balancer of the second RRG located in the NIC;
   select, based on the second higher-level classification item and a load balancing policy of the second receive load balancer, a second RR in the second RRG for the second packet;
   send, in response to selecting the second RR, the second packet to the second RR; and
   send the second packet from the second RR to the host, wherein the second packet is received by a second VNIC.

17. The non-transitory computer readable medium of claim 14, wherein sending the first packet from the first RR to the host comprises one selected from a group consisting of using an interrupt issued by the NIC and receiving a polling request from the host.

18. The non-transitory computer readable medium of claim 14, wherein the plurality of executable instructions further comprise functionality to:
   receive, by the NIC, a second packet from the first VNIC on the host, wherein the first VNIC is associated with a transmit ring group comprising a plurality of transmit rings;
   select, using a transmit load balancer, a transmit ring of the plurality of transmit rings;
   send the second packet to the transmit ring; and
   issuing, by the NIC, the second packet from the transmit ring to the network.

19. The non-transitory computer readable medium of claim 14, wherein the plurality of executable instructions further comprise functionality to:
   evaluate a plurality of higher-level classification rules associated with the first RRG; and
   determine, based on evaluating the plurality of higher-level classification rules and before selecting the first RR, that the second higher-level classification item does not match any of the plurality of RRs.

20. The non-transitory computer readable medium of claim 14, wherein the L2 classification item is a media access control address.

* * * * *